(12) United States Patent
Watanabe et al.

(10) Patent No.: US 6,243,150 B1
(45) Date of Patent: Jun. 5, 2001

(54) LIQUID CRYSTAL DISPLAY DEVICE

(75) Inventors: Takeshi Watanabe; Hideto Sasagawa, both of Fukushima-ken (JP)

(73) Assignee: Alps Electric Co., LTD, Tokyo (JP)

( * ) Notice: Subject to any disclaimer, the term of this patent is extended or adjusted under 35 U.S.C. 154(b) by 0 days.

(21) Appl. No.: 09/277,217

(22) Filed: Mar. 25, 1999

(30) Foreign Application Priority Data

Mar. 26, 1998 (JP) .................................................. 10-079089

(51) Int. Cl.$^7$ ................................................. G02F 1/1335
(52) U.S. Cl. ................................................. 349/65; 349/12
(58) Field of Search ........................ 349/65, 64, DIG. 12

(56) References Cited

U.S. PATENT DOCUMENTS 5,886,759 * 3/1999 Mashino et al. ........................ 349/65
6,048,071 * 4/2000 Sawayama .............................. 349/65
6,151,089 * 11/2000 yang et al. ............................. 349/65

FOREIGN PATENT DOCUMENTS

3132660 * 3/1983 (DE) ...................................... 349/65

* cited by examiner

*Primary Examiner*—James A. Dudek
(74) *Attorney, Agent, or Firm*—Brinks Hofer Gilson & Lione

(57) ABSTRACT

Disclosed is a liquid crystal display device in which the entire effective display region of a liquid crystal display element is sufficiently illuminated by a lamp. A reflecting member is provided on an end face of a lower substrate of a tablet opposite from an end face opposing a lamp. A liquid crystal display element disposed below the tablet is illuminated with incident light from the lamp that enters the lower substrate from the lamp-side end face, and reflected light obtained by reflecting the incident light from the reflecting member.

7 Claims, 5 Drawing Sheets

LIQUID CRYSTAL DISPLAY DEVICE

BACKGROUND OF THE INVENTION

1. Field of the Invention

The present invention relates to a liquid crystal display device, and more particularly, to a reflective liquid crystal display device having a tablet.

2. Description of the Related Art

FIGS. 7, 8, and 9 are a cross-sectional view, a principal-part sectional view, and an explanatory view, respectively, of a conventional liquid crystal display device. The conventional liquid crystal display device has a box-shaped casing 21 molded from synthetic resin which is open at the top thereof. The casing 21 is composed of a bottom plate 21a, and four side walls 21b formed on all sides of the bottom plate 21a.

A reflective liquid crystal display element 22 includes a display portion 22a in which liquid crystal is sealed between two transparent glass substrates, and a back reflecting plate 22b disposed outside one of the substrates in the display portion 22a and having a light diffusing ability.

A control member 23 is electrically connected, in which electric parts, such as an IC, are mounted on the side of the liquid crystal display element 22.

A tablet 24 is an input device for converting the coordinates of the position in the plane into electric signals, and comprises a lower substrate 24a made of a transparent glass or the like; a transparent lower electrode portion 24b disposed on the upper surface of the lower substrate 24a and made of indium oxide or the like; a plurality of dot spacers 24c arranged at intervals on the upper surface of the lower electrode portion 24b, which are formed by being printed in a transparent ink of acrylic resin or the like; a film 24d made of a transparent flexible synthetic resin and disposed above the dot spacers 24c; and a transparent upper electrode portion 24e made of indium oxide or the like, which is disposed on the lower surface of the film 24d to oppose the lower electrode portion 24b.

The thickness of the lower substrate 24a is approximately 0.7 mm to 1.8 mm. The dot spacers 24c are formed in a substantially fixed size so that they are 5 $\mu$m to 20 $\mu$m in height and 50 $\mu$m to 100 $\mu$m in diameter. The dot spacers 24c are arranged at intervals of 1.5 mm to 2 mm, and serve to space the lower electrode portion 24b and the upper electrode portion 24e. The entire thickness of the tablet 24 is approximately 1 mm to 2 mm.

A light guide 25 is made of a transparent material of acrylic resin or the like, and includes a light guide member 25a having a thickness of approximately 2 mm, and a plurality of semicircular dot patterns 25b formed on one side of the light guide member 25a by being printed in a transparent ink of acrylic resin or the like. These dot patterns 25b are equally sized so that they are approximately 20 $\mu$m in height and 50 $\mu$m to 100 $\mu$m in diameter, and are spaced at equal intervals.

Inside the casing 21, the liquid crystal display element 22, to which the control member 23 is attached, is held with the side of the back reflecting plate 22b down. The light guide 25 is located at a distance of approximately 0.5 mm above the liquid crystal display element 22 with the side of the dot patterns 25b up. The tablet 24 is located at a distance of approximately 0.5 mm above the light guide 25 with the side of the film 24d up. A lamp 26 having a diameter of approximately 1.5 mm and shaped like an elongated rod is placed inside the casing 21 in an appropriate manner so that it is positioned at the end face of the light guide member 25a.

A mounting member 27 formed of a metal plate is composed of a top plate 27a, an opening portion 27b formed in the top plate 27a, and four side plates 27c formed by bending all sides of the top plate 27a. The opening portion 27b is larger than that of an effective display region of the liquid crystal display element 22. The mounting member 27 is fixed the casing 21 in an appropriate manner so that the plate 27a covers the control member 23 and the lamp 26 is held inside the casing 21. Furthermore, the mounting member 27 is mounted so that the effective display region of the liquid crystal display element 22 can be visually recognized from the opening portion 27b via the tablet 24. In this way, the conventional liquid crystal display device is constructed.

In the conventional liquid crystal display device thus constructed, for example, a user presses an input pen (not shown) or the like against the film 24d in the tablet 24 disposed above the liquid crystal display element 22, in response to the contents displayed on the liquid crystal display element 22, so as to deform the film 24d, thereby bringing the upper electrode portion 24e into contact with the lower electrode portion 24b and inputting desired coordinates as electric signals. The display on the liquid crystal display element 22 is appropriately changed according to the input electric signals.

When the conventional liquid crystal display device is used in a dark environment, light from the lamp 26 enters the inside of the light guide member 25a from the end face thereof. In this case, a part of the incident light that travels upward is irregularly reflected by the dot patterns 25b formed on the upper surface of the light guide member 25a to change the angle, and then travels downward, as shown by the arrow X in FIG. 9. Since the light that is incident from the lamp 26 and travels toward the bottom of the light guide member 25a is incident on the lower surface of the light guide member 25a at a small angle, most components thereof are specularly reflected between the lower surface of the light guide member 25a and the atmosphere to travel upward, and are irregularly reflected by the dot patterns 25b to travel downward, as shown by the arrow Y in FIG. 9. Of the light that is thus directed downward, light, which is incident on the lower surface of the light guide member 25a at a nearly perpendicular angle, is transmitted through the light guide member 25a, and is radiated onto the display portion 22a, and the back reflecting plate 22b disposed thereunder in the liquid crystal display element 22. Therefore, the liquid crystal display device can be used in a dark environment. When the conventional liquid crystal display device is used in a light environment, since external light impinges on the back reflecting plate 22b, visibility of the liquid crystal display element 22 can be maintained without using the lamp 26.

In the conventional liquid crystal display device, however, when the lamp 26 is provided, it is necessary to interpose the light guide 25 between the tablet 24 and the liquid crystal display element 22. This increases the thickness and cost of the liquid crystal display device.

Furthermore, it is difficult for the lamp 26 to sufficiently illuminate the entire effective display region of the liquid crystal display element 22. In particular, it is difficult for the light to reach the vicinity of an end face W of the light guide 25 opposite from the side of the lamp 26. Moreover, since some light travels outside from the end face W, as shown by the arrow Z in FIG. 9, it is impossible to sufficiently illuminate the liquid crystal display element 22.

SUMMARY OF THE INVENTION

Accordingly, it is an object of the present invention to provide a liquid crystal display device in which the entire effective display region of a liquid crystal display element can be sufficiently illuminated by a lamp, and to reduce the thickness of the liquid crystal display device.

In order to achieve the above object, according to an aspect of the present invention, there is provided a liquid crystal display device including a tablet having a transparent lower substrate and a transparent dot spacer, a liquid crystal display element disposed below the tablet, and a lamp positioned at an end face of the lower substrate, wherein a reflecting member is provided on an end face of the lower substrate opposite from the end face on the side of the lamp so as to reflect light emitted from the lamp.

In this case, the transparent lower substrate of the tablet can also serve as a light guide for guiding light from the lamp to the reflective liquid crystal display element. This reduces the thickness of the liquid crystal display device and reduces the production cost thereof as well. Furthermore, the light from the lamp that enters the lower substrate is not scattered by the end face of the lower substrate opposite from the lamp, but is reflected by the reflecting member to become reflected light. The reflected light is combined with the incident light, thereby efficiently illuminating the liquid crystal display element by a single lamp.

Preferably, the lower substrate and the liquid crystal display element are closely opposed to each other. This makes it possible to more efficiently illuminate the liquid crystal display element, and to reduce the thickness of the liquid crystal display device.

Preferably, a means for irregularly reflecting light from the lamp is provided on the lower surface of the lower substrate. In this case, it is possible to uniformly and efficiently illuminate the liquid crystal display element.

The means for irregularly reflecting light may be formed of dot patterns made of a transparent material. In this case, it is possible to directly radiate, onto the liquid crystal display element, the light that is irregularly reflected by the lower surface of the lower substrate close to the upper surface of the liquid crystal display element. Moreover, since the liquid crystal display element can be efficiently illuminated even by a single lamp, visibility can be improved.

Preferably, the size of the dot patterns is largest near the center of the lower surface of the lower substrate, and gradually decreases toward the end faces of the lower substrate where the lamp and the reflecting member are provided. This makes it possible to uniformly radiate light onto the liquid crystal display element even when there are variations in light intensity distribution of the lower substrate.

Preferably, the density of the dot patterns is highest near the center of the lower surface of the lower substrate, and gradually decreases toward the end faces of the lower substrate where the lamp and the reflecting member are provided. This makes it possible to uniformly radiate light onto the liquid crystal display element even when there are variations in light intensity distribution of the lower substrate. This advantage can be further improved by changing the size of the dot patterns in combination.

The means for irregularly reflecting light may be formed of an uneven portion formed on the lower surface of the lower substrate. In this case, it is possible to directly radiate, onto the liquid crystal display element, the light that is irregularly reflected by the lower surface of the lower substrate close to the upper surface of the liquid crystal display element. Furthermore, since the liquid crystal display element can be efficiently illuminated even by a single lamp, visibility can be improved.

The density of the uneven portion is highest near the center of the lower surface of the lower substrate, and gradually decreases toward the end faces of the lower substrate where the lamp and the reflecting member are provided. This makes it possible to uniformly illuminate the liquid crystal display element even when there are variations in light intensity distribution of the lower substrate.

Further objects, features, and advantages of the present invention will become apparent from the following description of the preferred embodiments with reference to the attached drawings.

DESCRIPTION OF THE PREFERRED EMBODIMENTS

Figure 1:
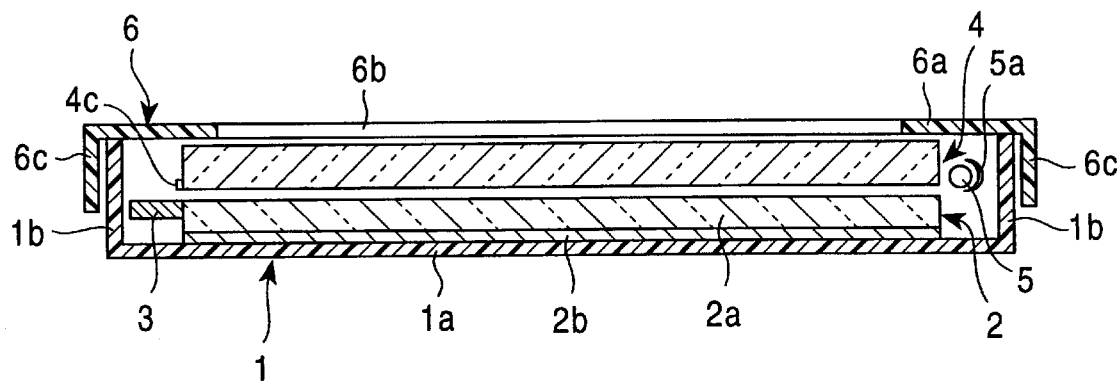
FIG. 1 is a cross-sectional view of a liquid crystal display device according to a first embodiment of the present invention.
Figure 2:
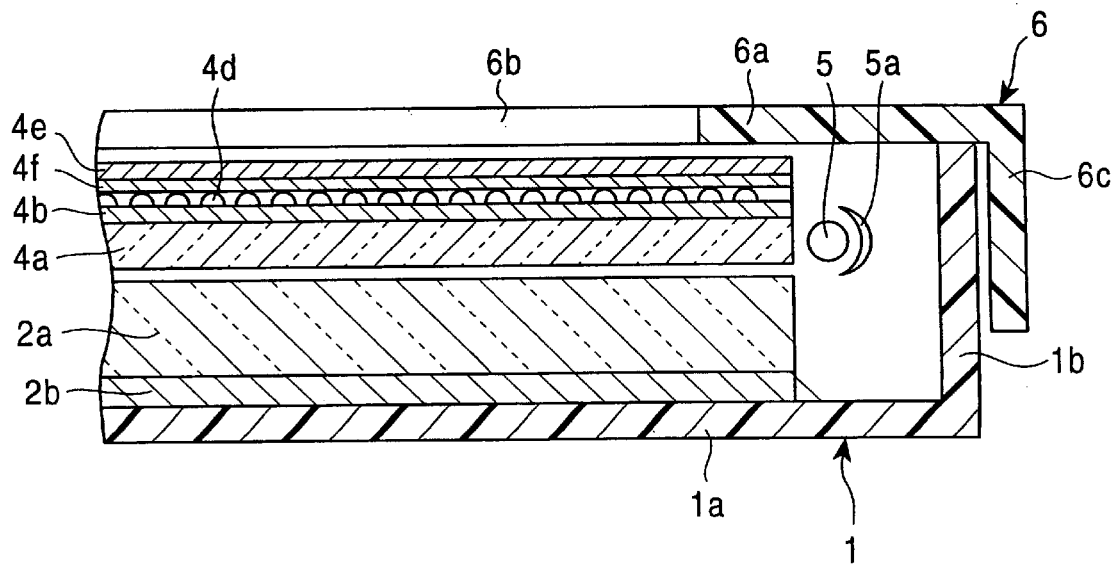
FIG. 2 is a cross-sectional view showing the principal part of the liquid crystal display device of the first embodiment.
Figure 3:
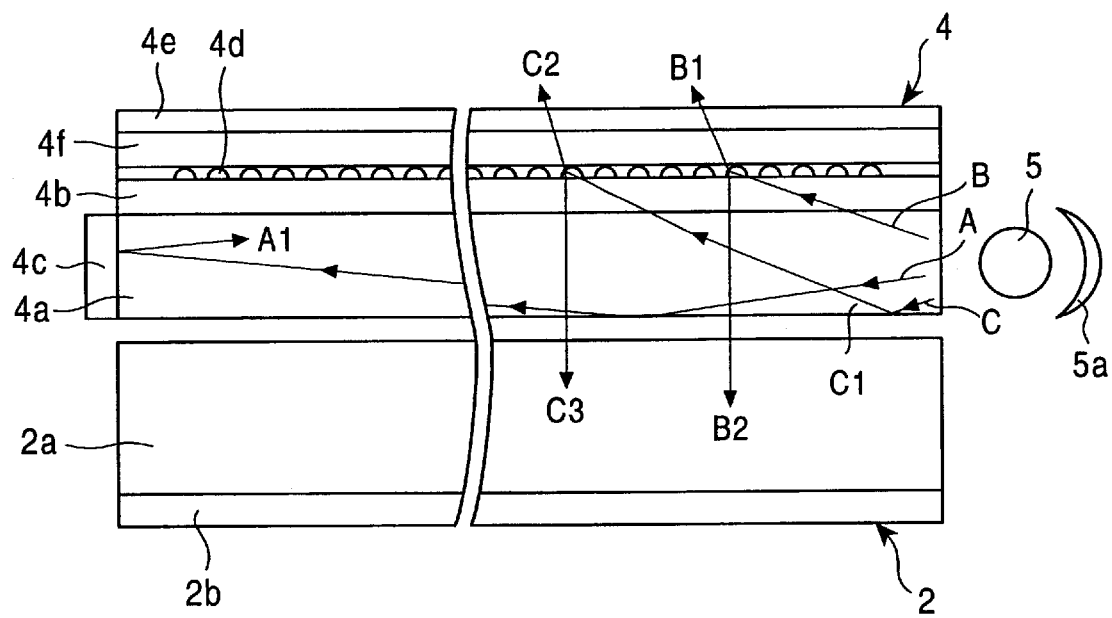
FIG. 3 is an explanatory view of the liquid crystal display device of the first embodiment.

FIGS. 1, 2, and 3 are a cross-sectional view, a principal-part sectional view, and an explanatory view, respectively, of a liquid crystal display device according to a first embodiment of the present invention. The liquid crystal display device has a box-shaped casing 1 molded from synthetic resin which is open at the top thereof. The casing 1 is composed of a bottom plate 1a, and four side walls 1b formed on all sides of the bottom plate 1a.

A reflective liquid crystal display element 2 includes a display portion 2a in which liquid crystal is sealed between two transparent glass substrates, and a back reflecting plate 2b disposed outside one of the substrates in the display portion 2a and having a light diffusing ability. A control member 3 is electrically connected, in which electric parts, such as an IC, are mounted on the side of the liquid crystal display element 2.

A tablet 4 comprises a lower substrate 4a formed of a transparent glass or the like; a transparent lower electrode portion 4b disposed on the upper surface of the lower substrate 4a and made of indium oxide or the like; a reflecting member 4c formed by applying silver paste or the like onto one end face of the lower substrate 4a; a plurality of semicircular dot spacers 4d arranged at intervals on the upper surface of the lower electrode portion 4b, which are formed by being printed in a transparent ink of acrylic resin or the like; a film 4e made of a transparent flexible synthetic resin and disposed above the dot spacers 4d; and a transparent upper electrode portion 4f made of indium oxide or the like, which is disposed on the lower surface of the film 4e to oppose the lower electrode portion 4b, and is separated by the dot spacers 4d at a predetermined distance from the lower electrode portion 4b.

The thickness of the lower substrate 4a is approximately 0.7 mm to 1.8 mm. The dot spacers 4d are substantially shaped like a semicircle in outline, and are formed in a fixed size within the height range of 0.3 µm to 10 µm and the diameter range of 20 µm to 150 µm. The dot spacers 4d are arranged at fixed intervals within the range of 50 µm to 1000 µm, and serve to space the lower electrode portion 4b and the upper electrode portion 4f. The entire thickness of the tablet 4 is approximately 1 mm to 2 mm.

The lower substrate 4a may be formed by a plate of acrylic or polycarbonate that is a transparent rigid plastic. Furthermore, the film 4e may be formed of a glass member having a thickness of approximately 0.2 mm.

Inside the casing 1, the liquid crystal display element 2, to which the control member 3 is attached, is held with the side of the back reflecting plate 2b down. The tablet 4 is located at a distance of approximately 0.5 mm above from the liquid crystal display element 2 with the side of the film 4e up so that the lower substrate 4a is closely opposed to the liquid crystal display element 2. A lamp 5 having a diameter of approximately 1.5 mm and shaped like an elongated rod is placed inside the casing 1 in an appropriate manner so that it is positioned on the side of the lower substrate 4a opposite from the end face where the reflecting member 4c is provided. On the side of the lamp 5 opposite from the end face of the lower substrate 4a, a lamp reflector 5a is disposed to collect light from the lamp 5.

A mounting member 6 formed of a metal plate is composed of a top plate 6a, an opening portion 6b formed in the top plate 6a, and four side plates 6c formed by bending all sides of the top plate 6a. The opening portion 6b is formed larger than an effective display region of the liquid crystal display element 2. The mounting member 6 is fixed on the casing 1 in an appropriate manner so that the top plate 6a covers the control member 3 and the lamp 5 held inside the casing 1. Furthermore, the mounting member 6 is attached so that the effective display region of the liquid crystal display element 2 can be visually recognized from the opening portion 6b via the tablet 4. In this way, the liquid crystal display device of the present invention is constructed.

Referring to FIG. 3, when the liquid crystal display device of this embodiment is used in a dark environment, light from the lamp 5 enters the inside of the lower substrate 4a in the tablet 4 from the end face thereof, directly or after being collected by the lamp reflecting plate 5a. While a part of this incident light (indicated by the arrow A) is transmitted to the outside of the lower substrate 4a, most of the light is specularly reflected between the upper surface of the lower substrate 4a and the atmosphere, and between the lower surface of the lower substrate 4a and the atmosphere. This is because the light from the lamp 5 is incident on the upper surface and the lower surface of the lower substrate 4a at a very small angle of 10° or less. The light thus reaches the reflecting member 4c, directly or after being reflected inside the lower substrate 4a, and is reflected by the reflecting member 4c to become reflected light (indicated by the arrow A1). When the liquid crystal display device of this embodiment is used in an environment that is lighted enough to eliminate the necessity for illumination with the lamp 5, external light impinges on the back reflecting plate 2b, whereby visibility of the liquid crystal display element 2 is maintained.

Of the incident and reflected light, most components (indicated by the arrow B1) of light (indicated by the arrow B), which travel above the lower substrate 4a, pass through the lower electrode portion 4b, and reach the dot spacers 4d on the upper surface of the lower electrode portion 4b, are transmitted outside. The light is thus transmitted outside because the incident light from the lamp 5 is incident on the semicircular surfaces of the dot spacers 4d at a large incident angle of approximately 45° or more. Other components (indicated by the arrow B2) that are not transmitted are irregularly reflected by the semicircular surfaces of the dot spacers 4d to change the angle, and are directed downward.

Of the incident and reflected light, in particular, most components of light C, which is incident on the lower surface of the lower substrate 4a at a small angle, are specularly reflected between the lower surface of the lower substrate 4a and the atmosphere to travel upward. The upward traveling light passes through the lower electrode portion 4b, and reaches the dot spacers 4d disposed on the upper surface of the lower electrode portion 4b (indicated by the arrow C1). Most components (indicated by the arrow C2) of the light C1 are transmitted outside, while a part (the arrow C3) of the light C1 is irregularly reflected by the semicircular surfaces of the dot spacers 4d to change the angle, and is directed downward.

Of the downward traveling light C3, most components of light, which is incident on the lower surface of the lower substrate 4a at a nearly perpendicular angle, pass through the lower substrate 4a, and are radiated onto the display portion 2a and the back reflecting plate 2b in the liquid crystal display element 2, thereby improving visibility of the liquid crystal display element 2.

The reflecting member 4c may disposed with a flat light guide (not shown) made of a transparent material between the tablet 4 and the liquid crystal display element 2. In this case, the vicinity of the end face opposite from the lamp 5 can be well lighted.

Figure 4:
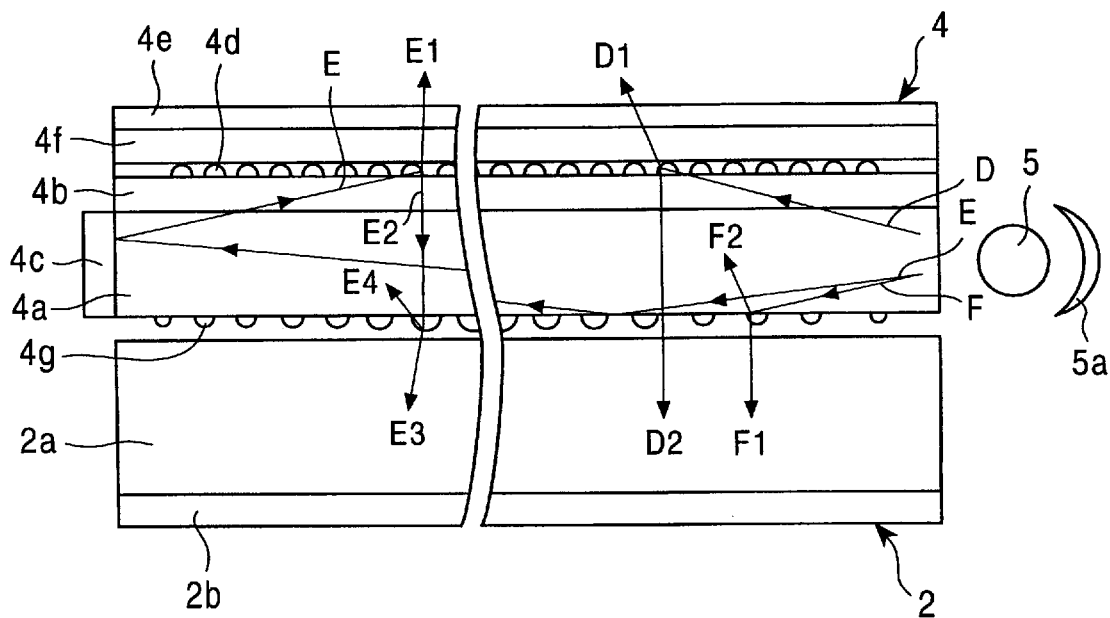
FIG. 4 is an explanatory view of a liquid crystal display device according to a second embodiment of the present invention.
Figure 5:
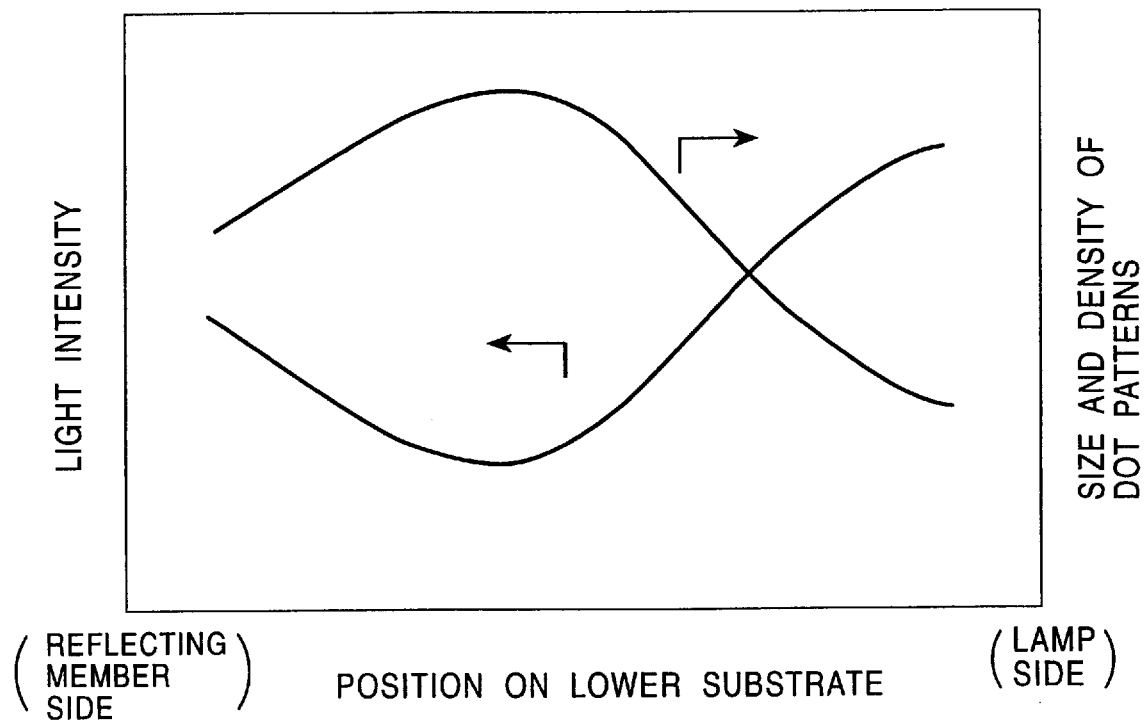
FIG. 5 is also an explanatory view of the liquid crystal display device of the second embodiment.

FIG. 4 is an explanatory view of a liquid crystal display device according to a second embodiment of the present invention, and FIG. 5 is a chart showing the relationship between the position on the lower substrate 4a and the light intensity distribution, and the relationship between the position on the lower substrate 4a and the size and density of dot patterns 4g. In this embodiment, a plurality of dot patterns 4g that serve as means for irregularly reflecting light are added to the construction of the first embodiment, which are made of a transparent material having a refractive index close to that of a lower substrate 4a in a tablet 4 and are disposed on the lower surface of the lower substrate, that is, the surface closely opposing a liquid crystal display element 2. These dot patterns 4g are formed in a substantially semicircular outline by being printed in a transparent ink of acrylic resin or the like, and are arranged at intervals of 100 µm to 200 µm. The height and diameter of the dot patterns 4g are 10 µm to 20 µm, and 50 µm to 100 µm, respectively. The difference in refractive index between acrylic resin or the like that forms the dot patterns 4g and glass or the like that forms the lower substrate 4a is approximately ±0.2 or less.

The size of the dot patterns 4g on the lower substrate 4a gradually increases from one end face of the lower substrate 4a on the side of a lamp 5 toward the other end face provided with a reflecting member 4c, is largest near the center of the lower substrate 4a, and gradually decreases toward the side of the reflecting member 4c.

Similarly, the density of the dot patterns 4g on the lower substrate 4a gradually increases from the end face of the lower substrate 4a on the side of the lamp 5 toward the other end face on the side of the reflecting member 4c, is highest near the center of the lower substrate 4a, and gradually decreases toward the side of the reflecting member 4c.

When the liquid crystal display device of this embodiment is used in a dark environment, light from the lamp 5 enters the inside of the lower substrate 4a of the tablet 4 from the end face, in a manner similar to the first embodiment. Of the incident light, incident light (indicated by the arrow D), which travels above the lower substrate 4a, and reflected light (indicated by the arrow E), which is reflected by the reflecting member 4c and travels above the lower substrate 4a, reach dot spacers 4d. Most components (indicated by the arrows D1 and E1) of the light are transmitted outside, whereas a part of the light (indicated by the arrows D2 and E2) is irregularly reflected by the semicircular surfaces of the dot spacers 4d to change the angle, and is directed downward. Of the light that is thus directed downward, light (indicated by the arrow D2), which is incident on the lower surface of the lower substrate 4a, is transmitted through the lower substrate 4a, and is radiated onto a display portion 2a and a back reflecting plate 2b in the liquid crystal display element 2.

Light (indicated by the arrow E2), which is incident on the dot patterns 4g formed on the lower surface of the lower substrate 4a, of the light directed downward, and light (indicated by the arrow F), which directly travels toward the bottom of the lower substrate 4a, of the incident light, is hardly reflected between the dot patterns 4g and the lower substrate 4a, and travel into the dot patterns 4g. This is because the difference in refractive index between the dot patterns 4g and the lower substrate 4a is ±0.2 or less, that is, it is small. While most components of the light that enters the dot patterns 4g are caused by the semicircular surfaces of the dot patterns 4g to change the angle, they are transmitted through the dot patterns 4g, and are radiated onto the display portion 2a and the back reflecting plate 2b in the liquid crystal display element 2 (indicated by the arrows E3 and F1). The remaining light (indicated by the arrows E4 and F2) that is irregularly reflected by the dot patterns 4g without being transmitted, although the amount thereof is small, travels upward to the dot spacers 4d, where they are irregularly reflected downward again.

In the above-described manner, the light incident from the lamp 5 undergoes repetitions of irregular reflection, transmission, and the like, and is radiated onto the display portions 2a and the back reflecting plate 2b in the liquid crystal display element 2, thereby improving visibility of the liquid crystal display element 2.

The light intensities of the incident light and the reflected light inside the lower substrate 4a were found and superimposed to calculate a light intensity distribution. As shown in FIG. 5, the light intensity is highest near the lamp 5, gradually decreases from the lamp 5 toward the reflecting member 4c on the end face opposite from the lamp 5, is lowest near the center of the lower substrate 4a, and gradually increases toward the reflecting member 4c. This is because light reflected by the reflecting member 4c is added to the incident light from the lamp 5. The position where the light intensity is lowest varies depending on the transmittance of the material for forming the lower substrate 4a, the reflectance of the material for forming the reflecting member 4c, the illuminance of the lamp 5, and the like.

In this embodiment, as described above, the dot patterns 4g are large and are densely arranged near the center of the lower substrate 4a where the light intensity is low.

Therefore, light having a low intensity can be irregularly reflected with efficiency, and can be radiated onto the back reflecting plate 2b of the liquid crystal display element 2, thereby improving visibility of the display portion 2a.

Near the end faces of the lower substrate 4a on the sides of the lamp 5 and the reflecting member 4c where the light intensity is high, the dot patterns 4g on the lower substrate 4a are small and are sparsely arranged, as described above, whereby the light is prevented from being irregularly reflected. In this manner, it is possible to prevent variations in intensity of light to be radiated onto the liquid crystal display element 2, and to thereby achieve substantially uniform radiation.

The density of the dot patterns 4g may be varied with the size thereof fixed, or the size may be varied with the density fixed.

Other structures are similar to those in the first embodiment. The same components as in the first embodiment are denoted by the same numerals, and therefore, a description thereof is omitted.

Figure 6:
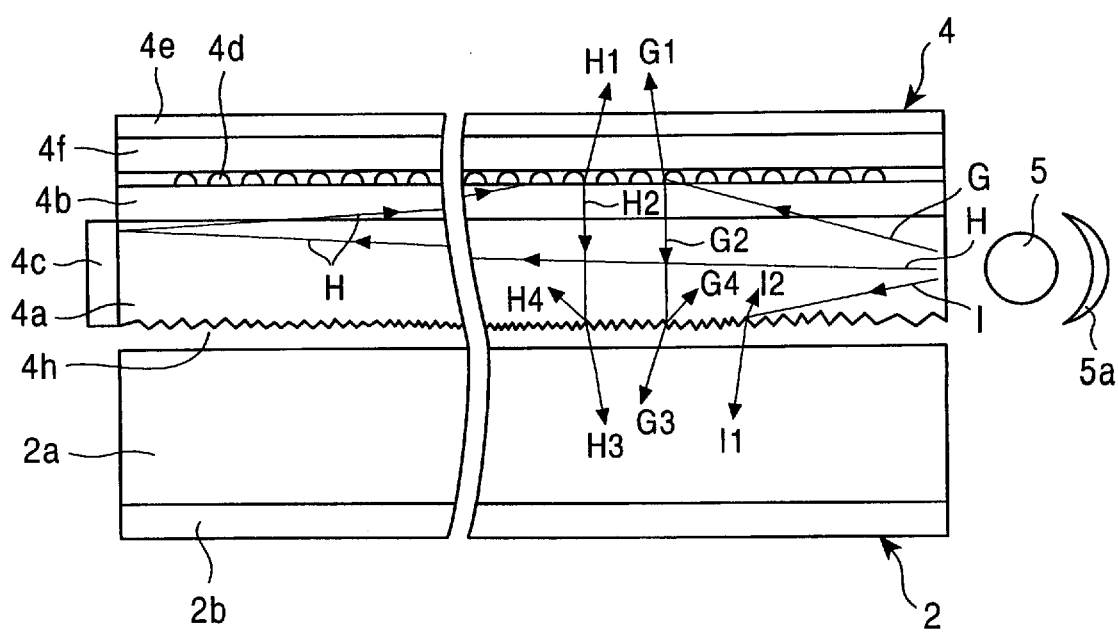
FIG. 6 is an explanatory view of a liquid crystal display device according to a third embodiment of the present invention.
Figure 7:
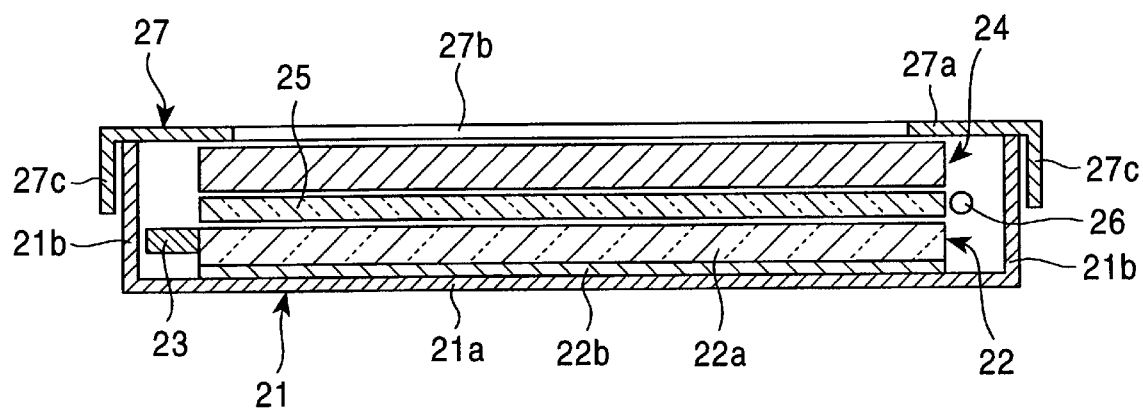
FIG. 7 is a cross-sectional view of a conventional liquid crystal display device.
Figure 8:
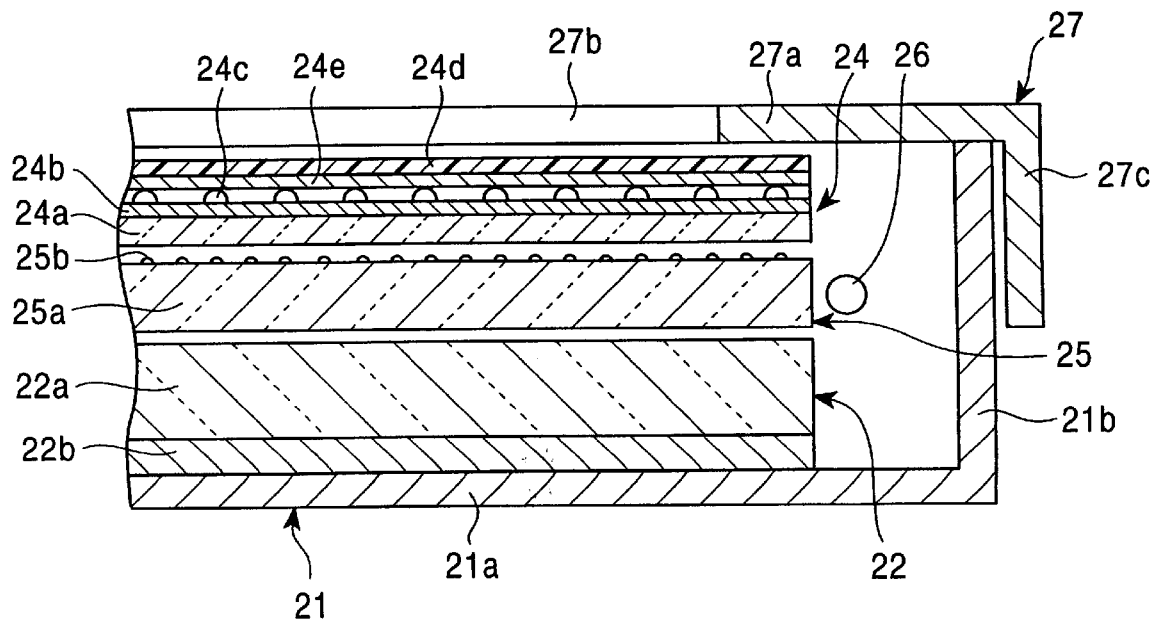
FIG. 8 is a cross-sectional view showing the principal part of the conventional liquid crystal display device.
Figure 9:
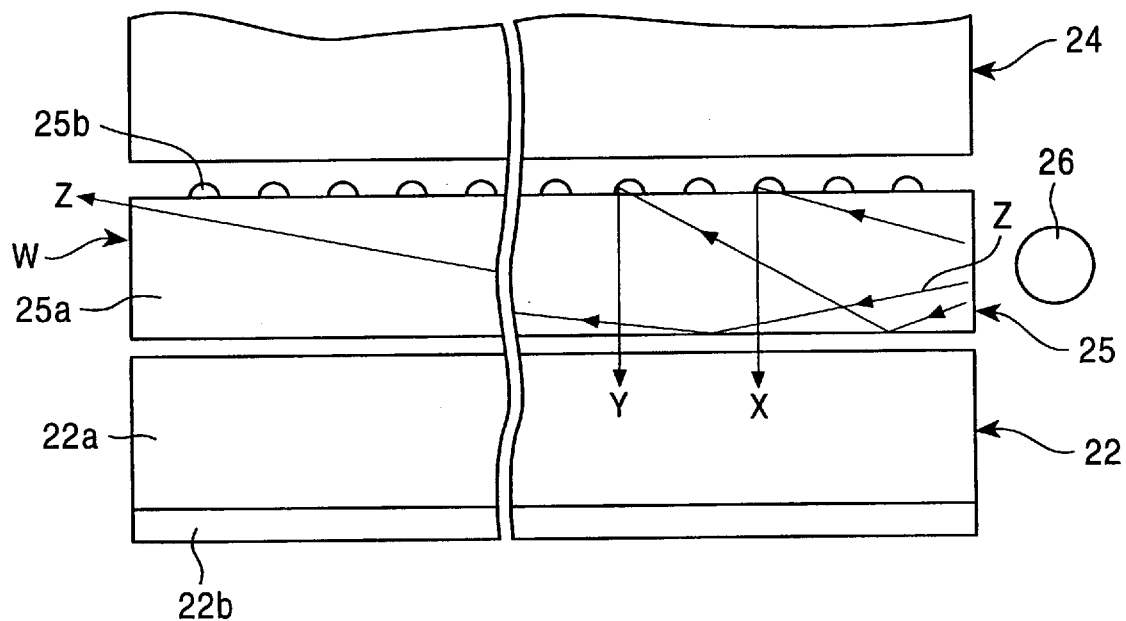
FIG. 9 is an explanatory view of the conventional liquid crystal display device.

FIG. 6 is an explanatory view of a liquid crystal display device according to a third embodiment of the present invention. In this embodiment, an uneven portion 4h is formed on the lower surface of a lower substrate 4a in a tablet 4, that is, the surface closely opposing a liquid crystal display element 2, so as to function as a means for irregularly reflecting light, in addition to the structure in the first embodiment. The uneven portion 4h is formed by sandblasting in which grains of sand or the like are blown against the lower substrate 4a. When the lower substrate 4a is made of glass, the uneven portion 4h may be formed by treatment with hydrofluoric acid. The depth of the uneven portion 4h is not more than 20 μm. The density of the uneven portion 4h gradually increases from one end face of the lower substrate 4a on the side of a lamp 5 toward the other end face provided with a reflecting member 4c, is highest near the center of the lower substrate 4a, and gradually decreases toward the end face on the side of the reflecting member 4c.

While the uneven portion 4h in this embodiment is directly formed on the lower surface of the lower substrate 4a, a transparent film that is previously formed in a desired uneven shape may be bonded to the lower surface of the lower substrate 4a with a transparent adhesive or the like so that its uneven surface faces down.

When the liquid crystal display device of this embodiment is used in a dark environment, light from the lamp 5 enters the inside of the lower substrate 4a in the tablet 4 from the end face thereof, in a manner similar to the first and second embodiments. Of the incident light, light (indicated by the arrow G) that travels above the top of the lower substrate 4a, and reflected light (indicated by the arrow H) that is reflected by the reflecting member 4c to travel above the lower substrate 4a, reach dot spacers 4d. While most components (indicated by the arrows G1 and H1) of the light that has reached the dot spacers 4d are transmitted to the outside, a part (indicated by the arrow G2 and H2) of the light is irregularly reflected by the semicircular surfaces of the dot spacers 4d to change the angle, and is directed downward. The downward traveling light (G2 and H2), and light (indicated by the arrow I), which directly travels toward the bottom of the lower substrate 4a, of the incident light, are caused by the uneven portion 4h on the lower substrate 4a to change the angle, whereas they are transmitted through the surface of the uneven portion 4h, and radiated onto a display portion 2a and a back reflecting plate 2b in the liquid crystal display element 2 (indicated by the arrows G3, H3, and I1). The remaining light (indicated by the arrows G4, H4, and I2) that is irregularly reflected by the uneven portion 4h without being transmitted, although the amount thereof is small, travels up to the dot spacers 4d, where they are irregularly reflected downward again. In the above-described manner, the light is radiated onto the display portion 2a and the back reflecting plate 2b in the liquid crystal display element 2, thereby improving visibility of the liquid crystal display element 2.

In this embodiment, the density of the uneven portion 4h is high near the center of the lower substrate 4a where the light intensity is low, in a manner similar to the second embodiment. Therefore, light having a low intensity can be irregularly reflected with efficiency, and visibility of the display portion 2a can be improved by the light radiated onto the back reflecting plate 2b of the liquid crystal element 2.

Near the end faces of the lower substrate 4a on the sides of the lamp 5 and the reflecting member 4c where the light intensity is high, the density of the uneven portion 4c on the lower substrate 4a is made low in order to restrict irregular reflection of light, as described above. In this way, it is possible to prevent the intensity of light to be radiated onto the liquid crystal display element 2 from varying, and to thereby achieve substantially uniform radiation.

Other structures are similar to those in the first and second embodiments. The same components are denoted by the same numerals, and therefore, a description thereof is omitted.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications, and equivalent structures and functions.

What is claimed is:

1. A liquid crystal display device, comprising:
   a tablet having a transparent lower substrate and a transparent dot spacer;
   a liquid crystal display element disposed below said tablet; and
   a lamp positioned at an end face of said lower substrate;
   wherein a reflecting member is provided on an end face on the side of said lamp so as to reflect light emitted from said lamp, and a means for irregularly reflecting light from said lamp is provided on the lower surface of said lower substrate.

2. A liquid crystal display device according to claim 1, wherein said lower substrate and said liquid crystal display element are closely opposed to each other.

3. A liquid crystal display device according to claim 1, wherein said means for irregularly reflecting light from said lamp is formed of dot patterns made of a transparent material.

4. A liquid crystal display device according to claim 3, wherein the size of said dot patterns is largest near the center of the lower surface of said lower substrate, and gradually decreases toward said end faces of said lower substrate where said lamp and said reflecting member are provided.

5. A liquid crystal display device according to claim 3, wherein the density of said dot patterns is highest near the center of the lower surface of said lower substrate, and gradually decreases toward said end faces of said lower substrate where said lamp and said reflecting member are provided.

6. A liquid crystal display device according to claim 1, wherein said means for irregularly reflecting light from said lamp is formed of an uneven portion formed on the lower surface of said lower substrate.

7. A liquid crystal display device according to claim 6, wherein the density of said uneven portion is highest near the center of the lower surface of said lower substrate, and gradually decreases toward said end faces of said lower substrate where said lamp and said reflecting member are provided.

* * * * *